(12) United States Patent
Ishihara et al.

(10) Patent No.: US 12,430,948 B2
(45) Date of Patent: Sep. 30, 2025

(54) APPARATUS AND METHOD FOR EMOTION ESTIMATION

(71) Applicants: TOYOTA JIDOSHA KABUSHIKI KAISHA, Toyota (JP); AISIN CORPORATION, Aichi-ken (JP)

(72) Inventors: Masahiro Ishihara, Tokyo-to (JP); Yuki Horiuchi, Tokyo-to (JP); Yuji Yamanishi, Tokyo-to (JP); Taku Mitsumori, Kariya (JP); Yuki Takeda, Kariya (JP)

(73) Assignees: TOYOTA JIDOSHA KABUSHIKI KAISHA, Toyota (JP); AISIN CORPORATION, Aichi-ken (JP)

( * ) Notice: Subject to any disclaimer, the term of this patent is extended or adjusted under 35 U.S.C. 154(b) by 389 days.

(21) Appl. No.: 18/088,018

(22) Filed: Dec. 23, 2022

(65) Prior Publication Data

US 2023/0206690 A1    Jun. 29, 2023

(30) Foreign Application Priority Data

Dec. 27, 2021  (JP) .................................. 2021-213429

(51) Int. Cl.
  *G06V 40/16*  (2022.01)
  *G06V 20/59*  (2022.01)
(52) U.S. Cl.
  CPC .......... *G06V 40/174* (2022.01); *G06V 20/597* (2022.01)

(58) Field of Classification Search
  CPC .... G06V 40/174; G06V 20/597; G06V 10/82; G06V 40/171; G06V 40/166; G06V 40/168
  See application file for complete search history.

(56) References Cited

U.S. PATENT DOCUMENTS

| | | | |
|---|---|---|---|
| 8,743,125 B2 * | 6/2014 | Omote ................. | G06T 13/205 |
| | | | 345/475 |
| 9,956,963 B2 * | 5/2018 | Vijaya Kumar ...... | B60W 40/08 |
| 10,963,678 B2 * | 3/2021 | Kim ..................... | G06V 40/161 |
| 11,113,890 B2 * | 9/2021 | Joseph ................. | G06V 40/176 |
| 11,302,124 B2 * | 4/2022 | Zhang .................. | B60W 60/00 |
| 11,314,389 B2 * | 4/2022 | You ..................... | B60K 35/60 |
| 11,453,401 B2 * | 9/2022 | Yamauchi ............ | B60W 50/14 |
| 11,462,027 B2 * | 10/2022 | Sano .................... | G06V 40/169 |
| 11,935,306 B2 * | 3/2024 | Goto .................... | G06V 40/174 |

(Continued)

FOREIGN PATENT DOCUMENTS

| | | |
|---|---|---|
| JP | 2005-56388 A | 3/2005 |
| JP | 2010-271872 A | 12/2010 |
| WO | 2019/193781 A1 | 10/2019 |

*Primary Examiner* — Wesley J Tucker
(74) *Attorney, Agent, or Firm* — Sughrue Mion, PLLC

(57) ABSTRACT

An apparatus for emotion estimation sets a face feature threshold based on a plurality of face features indicating a deviation from a reference state of a predetermined part of a face detected from each of a plurality of face images representing a face of a driver of a vehicle generated by a camera mounted on the vehicle in a predetermined time range, specifies face features larger than the face feature threshold among the plurality of face features detected from each of the face images generated by the camera at a time not included in the predetermined time range, and estimates an emotion of the driver by using normalized features obtained by normalizing the specified face features downward.

5 Claims, 5 Drawing Sheets

(56) References Cited

U.S. PATENT DOCUMENTS

| | | | |
|---|---|---|---|
| 12,122,392 B2* | 10/2024 | Ren | G16H 50/30 |
| 2006/0115157 A1 | 6/2006 | Mori et al. | |
| 2010/0296706 A1 | 11/2010 | Kaneda et al. | |
| 2011/0235919 A1* | 9/2011 | Morita | G08B 29/26 |
| | | | 382/195 |
| 2017/0311863 A1* | 11/2017 | Matsunaga | A61B 5/163 |
| 2018/0178766 A1* | 6/2018 | Oba | B60T 7/22 |
| 2020/0410217 A1 | 12/2020 | Sugimoto | |
| 2021/0261050 A1* | 8/2021 | Sobhany | B60Q 3/80 |
| 2021/0326586 A1* | 10/2021 | Sorci | G16H 15/00 |
| 2022/0172527 A1* | 6/2022 | Kim | B60W 40/08 |
| 2024/0286613 A1* | 8/2024 | Fujino | B60W 30/16 |
| 2025/0014470 A1* | 1/2025 | Liu | G09B 5/065 |

* cited by examiner

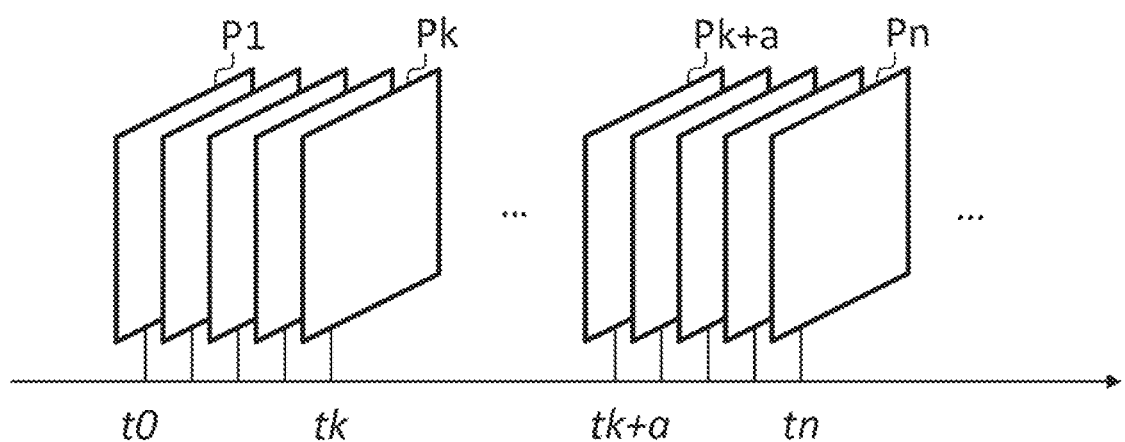

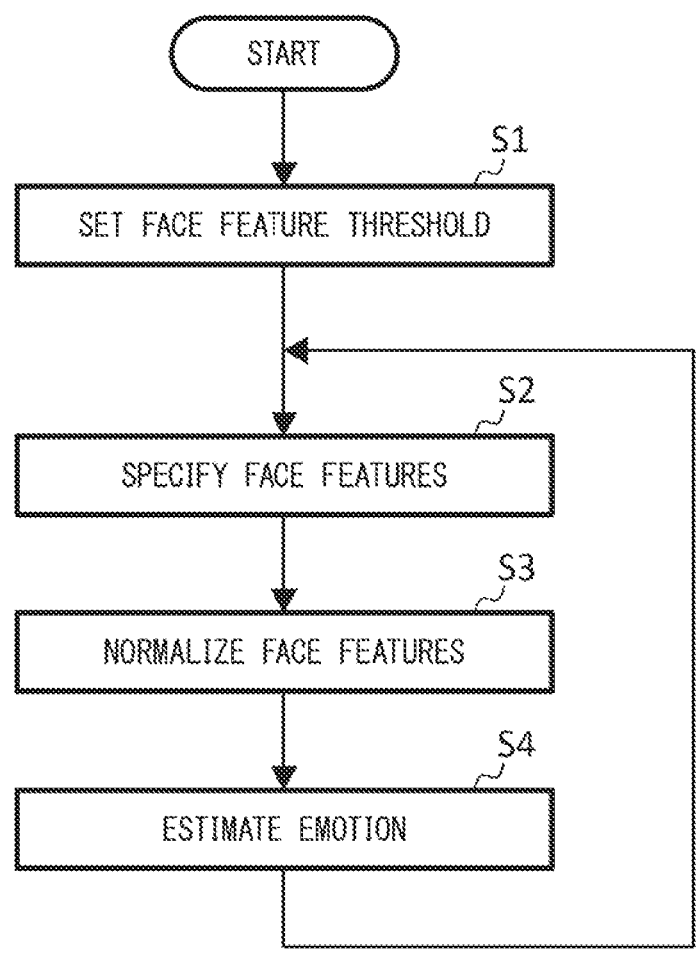

APPARATUS AND METHOD FOR EMOTION ESTIMATION

FIELD

The present disclosure relates to an apparatus and method for emotion estimation of a driver of a vehicle.

BACKGROUND

A technique for estimating an emotion based on a face features indicating a deviation from a reference state of each part of a face, which is detected from a face image representing a face of a person, is known. According to this technique, it is possible to change the travel control of the vehicle in accordance with the emotion of the driver estimated from the face image representing the face of the driver of the vehicle.

Japanese Unexamined Patent Publication No. 2005-056388 (hereinafter "Patent Literature 1") describes an image processor that obtains, for each characteristic point of a predetermined regions of a face in an image, a change amount from a characteristic point in a face of a predetermined facial expression, normalizes the change amount according to a size variation or a rotation variation of the face, and determines a facial expression based on the normalized change amount.

SUMMARY

According to the image processing apparatus of Patent Literature 1, characteristic points of a predetermined regions are detected as a reference in advance from an image including a face of a predetermined facial expression, and the characteristic points are compared with the characteristic points detected from the image to determine the facial expression. It is complicated to acquire an image including a face of a specific facial expression from a target person in advance. In addition, the characteristic points detected from an image when a target person has a blank facial expression sometimes confuse the appropriate emotion estimation.

It is an object of the present disclosure to provide an apparatus for emotion estimation that can appropriately estimate an emotion of a driver of a vehicle.

An apparatus for emotion estimation according to the present disclosure includes a processor configured to set a face feature threshold based on a plurality of face features indicating a deviation from a reference state of a predetermined part of a face detected from each of a plurality of face images representing a face of a driver of a vehicle generated by a camera mounted on the vehicle at a predetermined time range, specify face features larger than the face feature threshold among the plurality of face features detected from each of the face images generated by the camera at a time not included in the predetermined time range, and estimate an emotion of the driver by using normalized features obtained by normalizing the specified face features downward.

In the apparatus for emotion estimation according to the present disclosure, it is preferable that the predetermined time range includes a time immediately after the emotion estimation apparatus is activated.

In the apparatus for emotion estimation according to the present disclosure, it is preferable that, at the setting of the face feature threshold, the processor sets, as the face feature threshold, a value of the face feature located at a predetermined ratio from the minimum value when the plurality of face features detected from each of the plurality of face images generated at the time included in the predetermined time range are arranged in ascending order.

In the apparatus for emotion estimation according to the present disclosure, it is preferable that, at the setting of the face feature threshold, the processor sets the face feature threshold for each of facial action units included in each of the face images, and at the specification of the face feature, the processor specifies for each of the facial action units, the face features larger than the face feature threshold set for the facial action unit.

The method for emotion estimation according to the present disclosure includes: setting a face feature threshold based on a plurality of face features indicating a deviation from a reference state of a predetermined part of a face detected from each of face images representing a face of a driver of a vehicle generated by a camera mounted on the vehicle at a time included in a predetermined time range, specifying face features larger than the face feature threshold among the plurality of face feature detected from each of the face images generated by the camera at a time not included in the predetermined time range; and estimating an emotion of the driver using normalized features obtained by normalizing the specified face features downward.

The apparatus according to the present disclosure can estimate the emotion of the driver of the vehicle appropriately.

BRIEF DESCRIPTION OF DRAWINGS

FIG. 4A illustrates a plurality of face images, and FIG. 4B illustrates a plurality of face features detected from each of face images.

FIG. 6 is a flowchart of emotion estimation process.

DESCRIPTION OF EMBODIMENTS

Hereinafter, an apparatus that can appropriately estimate an emotion of a driver of a vehicle will be explained in detail with reference to the accompanying drawings. The apparatus for emotion estimation sets a face feature threshold based on a face feature indicating a deviation from a reference state of a predetermined part of the face, which is detected from each of a face images representing a face of a driver of a vehicle generated by a camera mounted on the vehicle at a time included in a predetermined time range. The apparatus specifies face features larger than the face feature threshold among the plurality of face features detected from each of the face images generated by the camera at a time not included in the predetermined time range. The apparatus estimates an emotion of the driver using normalized features obtained by normalizing the specified face features downward.

Figure 1:
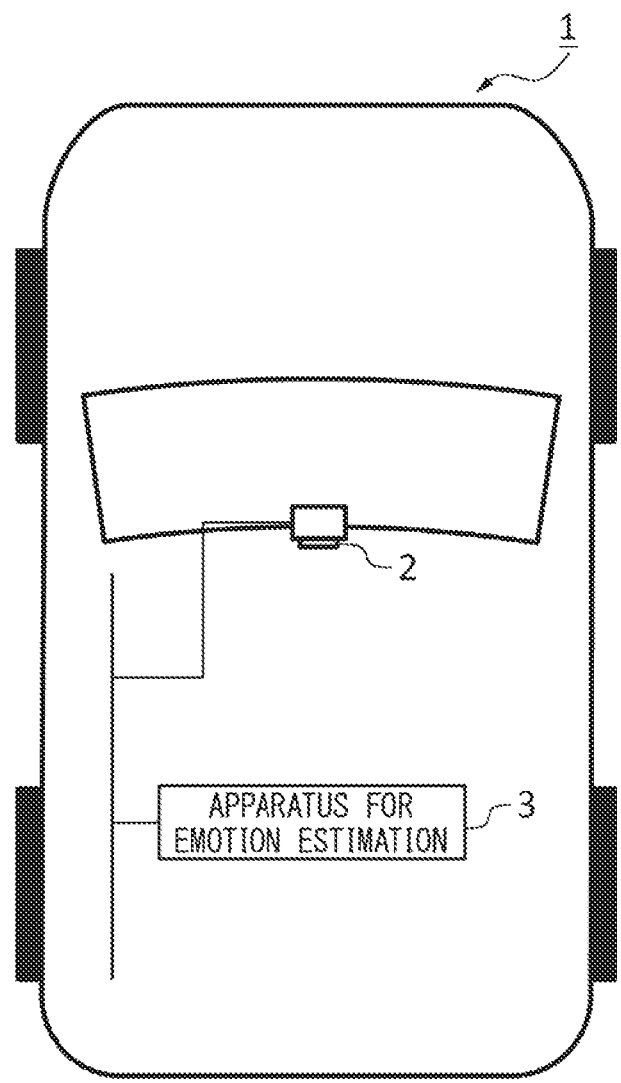
FIG. 1 schematically illustrates the configuration of a vehicle including an apparatus for emotion estimation.

FIG. 1 schematically illustrates the configuration of a vehicle including an apparatus for emotion estimation.

The vehicle 1 includes a driver monitor camera 2 and an apparatus 3 for emotion estimation. The driver monitor camera 2 and the apparatus 3 are communicably connected via an in-vehicle network conforming to a standard, such as a controller area network, so that they can communicate with each other.

The driver monitor camera 2 is an example of a capturing unit for generating a face image representing a face of a driver of the vehicle. The driver monitor camera 2 includes a two-dimensional detector constructed from an array of optoelectronic transducers, such as CCDs or C-MOS, having sensitivity to infrared light, and a focusing optical system focusing an image on a target region on the two-dimensional detector. The driver monitor camera 2 also includes a light source that emits infrared light. The driver monitor camera 2 is mounted, for example, in the front and upper area in the interior of the vehicle and oriented toward the face of the driver sitting on the driver's seat. The driver monitor camera 2 irradiates the driver with infrared light every predetermined capturing period (e.g. 1/30 to 1/10 second), and outputs an image showing the driver's face.

The apparatus 3 is an electronic control unit (ECU) including a communication interface, a memory, and a processor. The apparatus 3 estimates the emotion of the driver of the vehicle 1 using the image generated by the driver monitor camera 2.

The vehicle 1 appropriately operates each unit of the vehicle 1 in accordance with the emotion of the driver estimated by the apparatus 3. For example, when an anxiety is detected as an emotion of the driver, the vehicle 1 lowers a traveling speed in automatic driving by a travel controller (not shown). In addition, in a case where boredom is detected as an emotion of the driver, the vehicle 1 outputs music desired by the driver from a speaker (not shown).

Figure 2:
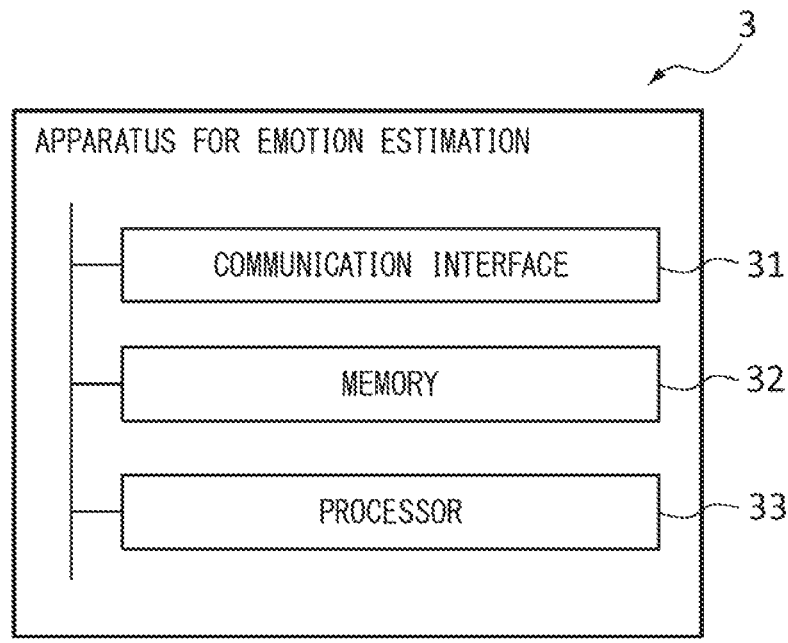
FIG. 2 schematically illustrates the hardware of the apparatus for emotion estimation.

FIG. 2 schematically illustrates the hardware of the apparatus for emotion estimation. The apparatus 3 includes a communication interface 31, a memory 32, and a processor 33.

The communication interface 31 is an example of a communication unit, and includes a communication interface circuit for connecting the apparatus 3 to the in-vehicle network. The communication interface 31 provides the received data for the processor 33. The communication interface 31 outputs the data provided from the processor 33 to an external device.

The memory 32 includes volatile and non-volatile semiconductor memories. The memory 32 stores various types of data used for processing by the processor 33, such as, parameters of a neural network used as a classifier for detecting a face feature from a face image. The memory 32 also stores various application programs, such as, an emotion estimation program for executing emotion estimation process.

The processor 33 is an example of a control unit and includes one or more processors and peripheral circuits thereof The processor 33 may further include other arithmetic circuits such as a logical operation unit, a numerical operation unit, or a graphics processing unit.

Figure 3:
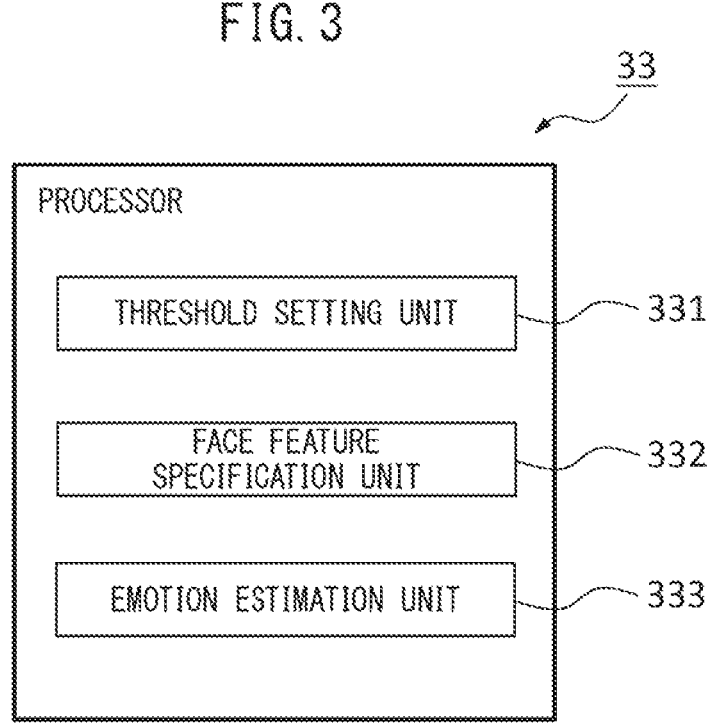
FIG. 3 is a functional block diagram of a processor included in the apparatus for emotion estimation.

FIG. 3 is a functional block diagram of a processor included in the apparatus for emotion estimation.

As its functional blocks, the processor 33 of the apparatus 3 includes a threshold setting unit 331, a face feature specification unit 332, and an emotion estimation unit 333. These units included in the processor 33 are functional modules implemented by a program executed on the processor 33. Alternatively, these units may be implemented in the apparatus 3 as separate integrated circuits, microprocessors, or firmware.

The threshold setting unit 331 sets a face feature threshold based on a plurality of face features indicating a deviation from a reference state of a predetermined part of the face, which is detected from a face image representing a face of a driver of the vehicle generated by a capturing unit mounted on the vehicle at a time included in a predetermined time range. In the present embodiment, the threshold setting unit 331 acquires a plurality of face images representing the face of the driver of the vehicle 1 generated by the driver monitor camera 2 at a time included in a predetermined time range. The threshold setting unit 331 detects the positions of the facial action units (FAUs) by inputting each of the plurality of acquired face images to a classifier trained to detect FAUs that acts in accordance with a change in emotion in the face, such as the inner and outer canthi and the corners of the mouth. The threshold setting unit 331 detects, as a plurality of face features, the deviation in the position of the FAUs detected from each of the plurality of face images from the position of the FAUs in the reference face model. The FAU is an example of a predetermined part of the face.

The classifier may be, for example, a convolutional neural network (CNN) including convolutional layers connected in series from the input toward the output. A large number of face images including FAUs are inputted to the CNN as a training data in advance, and the CNN that has been trained with the training data operates as a classifier that specifies the FAUs.

The threshold setting unit 331 sets, as the face feature threshold, a value of the face feature located at a predetermined ratio (for example, 95%) from the minimum value when the plurality of face features detected from each of the plurality of face images are arranged in ascending order.

The threshold setting unit 331 may set the face feature threshold based on the face features detected from each of the face images generated at the time included in the time range including the time immediately after the apparatus 3 is activated. The time range including the time immediately after the apparatus 3 is activated is, for example, a range up to 5 minutes after the apparatus 3 is activated.

FIG. 4A is a diagram for explaining a plurality of face images, and FIG. 4B is a diagram for explaining a plurality of face features detected from each of the face images.

As shown in FIG. 4A, facial images P1 to Pn are generated in a time range from time t1 to time tn. A plurality of face features are detected from each of the face images generated in this manner.

From each face images, a plurality of face features are detected for each of a plurality of FAUs. In the present embodiment, the face feature for a certain FAU is detected as a real number from 0 to 10. In FIG. 4B, for example, the face feature corresponding to FAU1, FAU2, . . . , FAU9 are detected from the face image generated at time t1. In this way, the face features detected from each of the face images generated in a certain time range can be expressed as a tensor.

Figure 5A:
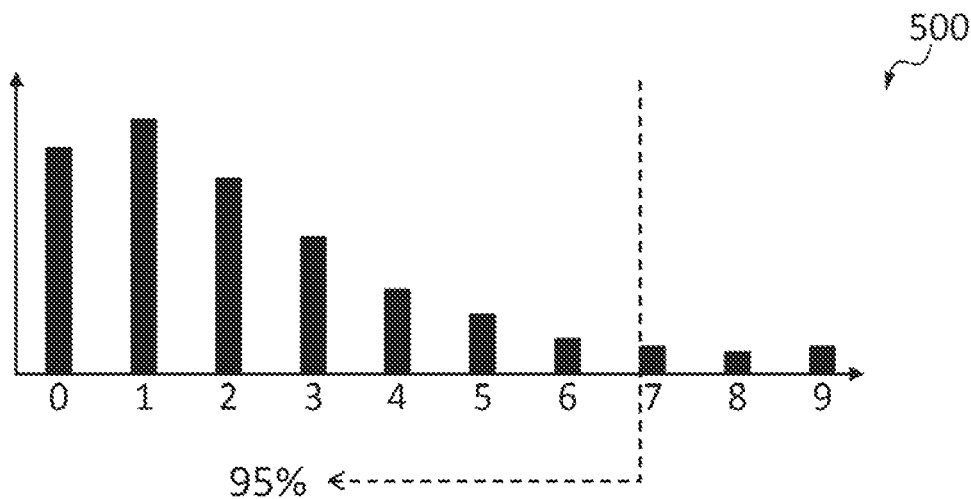
FIG. 5A illustrates a distribution of face features in a predetermined time range.

FIG. 5A illustrates a distribution of face features in a predetermined time-range.

A graph 500 in FIG. 5A shows the number of face features detected for one FAU from the face images generated in the predetermined time range. The horizontal axis indicates the value range of face features and height of the bar in the vertical axis direction on the certain value range in the horizontal axis indicates the number of face features having a corresponding value to the range. For example, the height of the bar represented at the position of "0" on the horizontal axis indicates the number of face feature amounts having a value of 0 to 1 among the plurality of face features detected from the face images generated in the predetermined time range.

The threshold setting unit 331 sets, as the face feature threshold, the value of the face feature located at a predetermined ratio from the minimum value when the plurality of detected face features are arranged in ascending order. In FIG. 5A, the face feature threshold is set to 7, which is the face feature at a position from 0 to 95%.

The threshold setting unit 331 sets the face feature threshold of the face feature for the other FAUs in the same manner as shown for one FAU in FIG. 5A.

The face feature specification unit 332 specifies face features larger than the face feature threshold among the plurality of face features detected from each of the face images generated by the driver monitor camera 2 at a time not included in the predetermined time range.

Figure 5B:
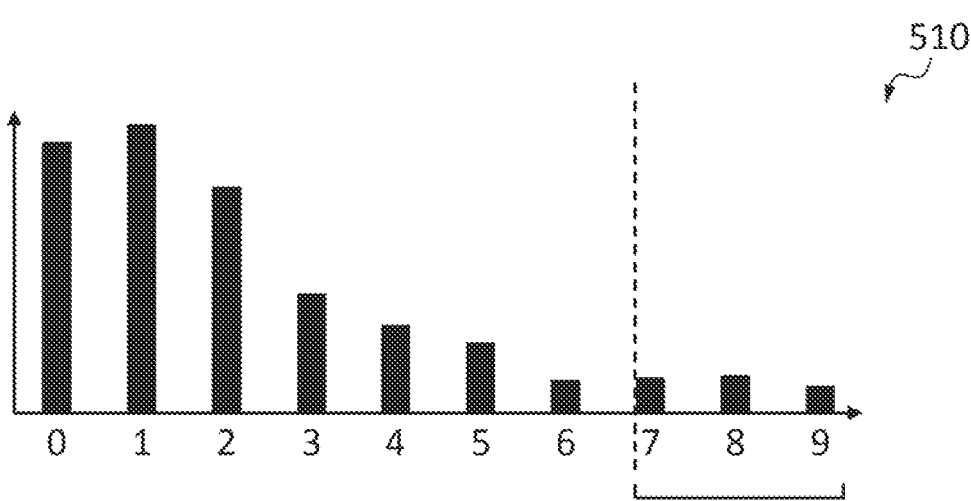
FIG. 5B illustrates a distribution of face features in a time range different from the time range in FIG. 5A.

FIG. 5B illustrates a distribution of face features in a time range different from the time range in FIG. 5A.

In FIG. 5B, the face feature specification unit 332 specifies face features having a value larger than 7 among the plurality of face features for one FAU generated in the target time range.

The face feature specification unit 332 specifies the face features for other FAUs in the same manner as shown for one FAU in FIG. 5B.

The emotion estimation unit 333 estimates the emotion of the driver of the vehicle 1 by inputting the normalized features, which are obtained by normalizing the specified face features downward, to the estimator trained to estimate a person's emotion based on the face features detected from the image representing the face of the person with a certain expression.

Figure 5C:
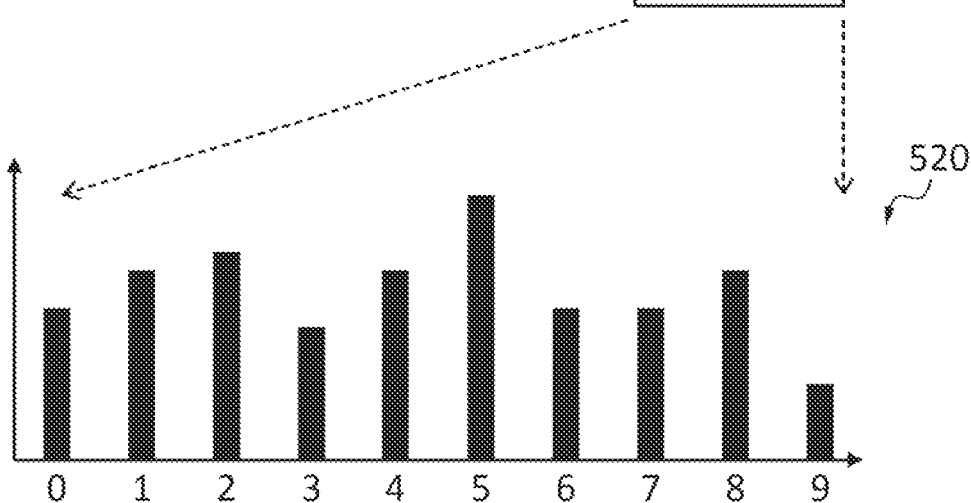
FIG. 5C illustrates a distribution of face features obtained by normalizing face features larger than face feature threshold downward.

FIG. 5C illustrates a distribution of face features obtained by normalizing face features larger than the face feature threshold downward.

The emotion estimation unit 333 changes each value of the specified face features so that the range from the face feature threshold to the maximum possible value of the face features corresponds to the range from the minimum possible value of the face features to the maximum possible value of the face features. In FIG. 5C, the emotion estimation unit 333 changes the respective values of the specified facial features in the range of 7-9 in FIG. 5B so that the range of 7-9 corresponds to the range of 0-9.

The estimator may be, for example, a neural network having a plurality of layers connected in series from the input to the output. A large number of face features detected from images representing faces of persons with expressions are inputted into a CNN as training data. The CNN that has been trained with the training data operates as an estimator for estimating an emotion.

FIG. 6 is a flowchart of emotion estimation process. The apparatus 3 executes an emotion estimation process each time it is activated.

First, the threshold setting unit 331 of the apparatus 3 sets the face feature threshold based on the plurality of face features detected from each of face images generated by the driver monitor camera 2 at a time included in a predetermined time range after the apparatus 3 is activated (step S1).

Next, the face feature specification unit 332 of the apparatus 3 specifies face features larger than the face feature threshold among the plurality of face features detected from each of the face images generated by the driver monitor camera 2 at a time not included in the predetermined time range (step S2).

Then, the emotion estimation unit 333 of the emotion estimation device 3 generates normalized features by normalizing the specified face features downward (step S3), and estimates the emotion of the driver of the vehicle 1 using the normalized features (step S4).

After the processing of step S4 is executed, the processing of the apparatus 3 returns to step S2, and the processing from step S2 to step S4 is repeated.

As described above, when the apparatus 3 executes the emotion estimation process, the apparatus 3 is less susceptible to the effect of the small-value face feature detected from the face image when the driver is expressionless, and thus it is possible to appropriately estimate the emotion of the driver of the vehicle.

It should be understood that various changes, substitutes and modifications can be made thereto by those skilled in the art without departing from the spirit and scope of the present disclosure.

What is claimed is:

1. An apparatus for emotion estimation comprising a processor configured to:
  set a face feature threshold, based on a plurality of values of a plurality of face features, to a first value, the face feature threshold indicating one or more of the plurality of face features deviating from a reference state of a predetermined part of a face detected from each of a plurality of face images representing a face of a driver of a vehicle generated by a camera mounted on the vehicle at a time included in a predetermined time range;
  specify one or more second values of one or more face features, among the plurality of face features from each of the face images generated by the camera at a time not included in the predetermined time range, being larger than the face feature threshold; and
  estimate an emotion of the driver using normalized features obtained by normalizing the one or more second values of the one or more face features downward by changing each of the one or more second values larger than the face feature threshold so that a first range from the face feature threshold to a maximum value of the one or more second values larger than the face feature threshold corresponds to a second range from a minimum value of the one or more second values larger than the face feature threshold to the maximum value of the one or more second values larger than the face feature threshold.

2. The apparatus for emotion estimation according to claim 1, wherein the predetermined time range includes a time immediately after the apparatus is activated.

3. The apparatus for emotion estimation according to claim 1, wherein the processor is further configured to, at the setting of the face feature threshold, set the first value to a value of the plurality of values of the plurality of face features that is located at a predetermined ratio from a minimum value of the plurality of values of the plurality of face features, in a state in which the plurality of values of the plurality of face features detected from each of the face images generated at a time included in the predetermined time range are arranged in ascending order.

4. The apparatus for emotion estimation according to claim 1, wherein the processor is further configured to:
  set the first value for each of a plurality of facial action units included in each of the plurality of face images, the plurality of facial action units being a plurality of predetermined parts of the face of the driver of the vehicle; and specify, for each of the plurality of facial action units, the one or more second values of the one or more face features larger than the first value.

5. A method for emotion estimation, comprising:

setting a face feature threshold, based on a plurality of values of a plurality of face features, to a first value, the face feature threshold indicating one or more of the plurality of face features deviating from a reference state of a predetermined part of a face detected from each of a plurality of face images representing a face of a driver of a vehicle generated by a camera mounted on the vehicle at a time included in a predetermined time range;

specifying one or more second values of one or more face features, among the plurality of face features from each of the face images generated by the camera at a time not included in the predetermined time range, being larger than the face feature threshold; and estimating an emotion of the driver using normalized features obtained by normalizing the one or more second values of the one or more face features downward by changing each of the one or more second values larger than the face feature threshold so that a first range from the face feature threshold to a maximum value of the one or more second values larger than the face feature threshold corresponds to a second range from a minimum value of the one or more second values larger than the face feature threshold to the maximum value of the one or more second values larger than the face feature threshold.

* * * * *